(12) United States Patent
Itou et al.

(10) Patent No.: US 10,564,623 B2
(45) Date of Patent: Feb. 18, 2020

(54) NUMERICAL CONTROLLER DETECTING A LIFETIME OF A BELT

(71) Applicant: FANUC CORPORATION, Minamitsuru-gun, Yamanashi (JP)

(72) Inventors: Hiromasa Itou, Yamanashi (JP); Motohiko Itou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/685,190

(22) Filed: Aug. 24, 2017

(65) Prior Publication Data

US 2018/0059642 A1 Mar. 1, 2018

(30) Foreign Application Priority Data

Sep. 1, 2016 (JP) .................... 2016-171209

(51) Int. Cl.
*G05B 19/4065* (2006.01)

(52) U.S. Cl.
CPC ........... *G05B 19/4065* (2013.01); *G05B 2219/37252* (2013.01)

(58) Field of Classification Search
CPC ........... G05B 19/4065; G05B 2219/37252
See application file for complete search history.

(56) References Cited

U.S. PATENT DOCUMENTS

| 4,698,622 A * | 10/1987 | Goto | ........... | E05F 15/632 340/648 |
| 7,573,219 B2 * | 8/2009 | Kees | ........... | F02N 11/04 318/432 |

(Continued)

FOREIGN PATENT DOCUMENTS

| CN | 201665426 U | 12/2010 |
| CN | 102616549 A | 8/2012 |

(Continued)

OTHER PUBLICATIONS

Katai, "Questions of V-Belt Lifetime Increasing Applied on Agricultural Mahcines", 2011, downloaded fron internet "http://archivum.szie.hu/JaDoX_Portlets/documents/document_3157_section_3301.pdf", pp. 1-24. (Year: 2011).*

(Continued)

*Primary Examiner* — Rocio Del Mar Perez-Velez
*Assistant Examiner* — Olvin Lopez Alvarez
(74) *Attorney, Agent, or Firm* — RatnerPrestia

(57) ABSTRACT

A numerical controller that achieves detection of a lifetime of a belt in a machine whose axis and motor are interconnected by the belt includes a axis pulse acquisition unit obtaining a pulse of a axis provided in a machining tool to be controlled, a motor pulse acquisition unit obtaining a pulse of the motor driving the axis, a axis revolution speed calculation unit calculating a revolution speed of the axis based on the obtained axis pulse, a motor revolution speed calculation unit calculating a revolution speed of the motor from the obtained motor pulse, a substantial slip distance calculation unit calculating a substantial slip distance of the belt from the axis revolution speed and the motor revolution speed, and a belt lifetime determination unit determining that the belt has reached the end of its lifetime when the substantial slip distance of the belt exceeds a predetermined threshold.

2 Claims, 4 Drawing Sheets

(56) References Cited

U.S. PATENT DOCUMENTS

| | | | | |
|---|---|---|---|---|
| 2008/0021603 A1* | 1/2008 | Zettel | ..................... | B60K 25/02 |
| | | | | 701/33.5 |
| 2010/0060677 A1* | 3/2010 | Jones | ................. | G01M 13/023 |
| | | | | 347/5 |
| 2010/0131232 A1* | 5/2010 | Taylor | .................... | F02B 77/081 |
| | | | | 702/147 |
| 2011/0222933 A1* | 9/2011 | Maruyama | ......... | G03G 15/2042 |
| | | | | 399/329 |
| 2012/0158226 A1* | 6/2012 | Prucka | ................... | B60K 6/485 |
| | | | | 701/22 |
| 2013/0131899 A1* | 5/2013 | Jung | ....................... | F16H 57/01 |
| | | | | 701/22 |
| 2014/0062345 A1* | 3/2014 | Orita | ..................... | H02P 31/00 |
| | | | | 318/15 |
| 2014/0246275 A1* | 9/2014 | Korvenranta | ....... | B66B 11/0476 |
| | | | | 187/254 |
| 2015/0145460 A1* | 5/2015 | Tajima | ................. | B60L 3/0023 |
| | | | | 318/490 |
| 2016/0076442 A1* | 3/2016 | Spohn | .................. | F02B 77/081 |
| | | | | 701/29.4 |
| 2017/0166197 A1* | 6/2017 | Jang | ........................ | B60K 6/26 |
| 2017/0359953 A1* | 12/2017 | Wallace | ................. | A01D 41/14 |
| 2019/0240402 A1* | 8/2019 | Consiglio | ............. | A61M 5/142 |

FOREIGN PATENT DOCUMENTS

| | | |
|---|---|---|
| CN | 204211078 U | 3/2015 |
| CN | 105501887 A | 4/2016 |
| JP | S 61-103750 A | 5/1986 |
| JP | 05224735 A | 9/1993 |
| JP | H 05-233046 A | 9/1993 |
| JP | 09133592 * | 5/1997 ............... G01L 5/00 |
| JP | 10115579 * | 5/1998 ............ G01M 99/00 |
| JP | 2003094289 A | 4/2003 |
| JP | 2005-246534 A | 9/2005 |
| JP | 201271925 * | 4/2012 ............ B65G 43/04 |
| JP | 2014116994 A | 6/2014 |
| JP | 2015-106936 | 6/2015 |

OTHER PUBLICATIONS

Eersel, "Slip behavior in the variator by measuring the belt speed", 2006, pp. 30. donnloaded from the internet at http://mate.tue.nl/mate/pdfs/6691.pdf (Year: 2006).*

Grzegożek1 et al, "The experiment analysis of the slip in the rubber belt CVT", 2016, pp. 1-8. downloaded from the internet at https://iopscience.iop.org/article/10.1088/1757-899X/148/1/012006/pdf (Year: 2016).*

Japanese Notification of Reasons for Refusal for Japanese Application No. 2016-171209, dated Oct. 23, 2018 with translation, 4 pages.

Japanese Decision to Grant a Patent for Japanese Application No. 2016-171209, dated Apr. 16, 2019, with translation, 5 pages.

Chinese Office Action for Chinese Application No. 201710772916.2, dated Nov. 29, 2019, with translation, 15 pages.

* cited by examiner

```
O0001;
N10 S1000;
N20 G04 X10.0;
N30 S10000;
N40 G04 X10.0;
N50 S4000;
N60 G04 X10.0;
,
M30;
```

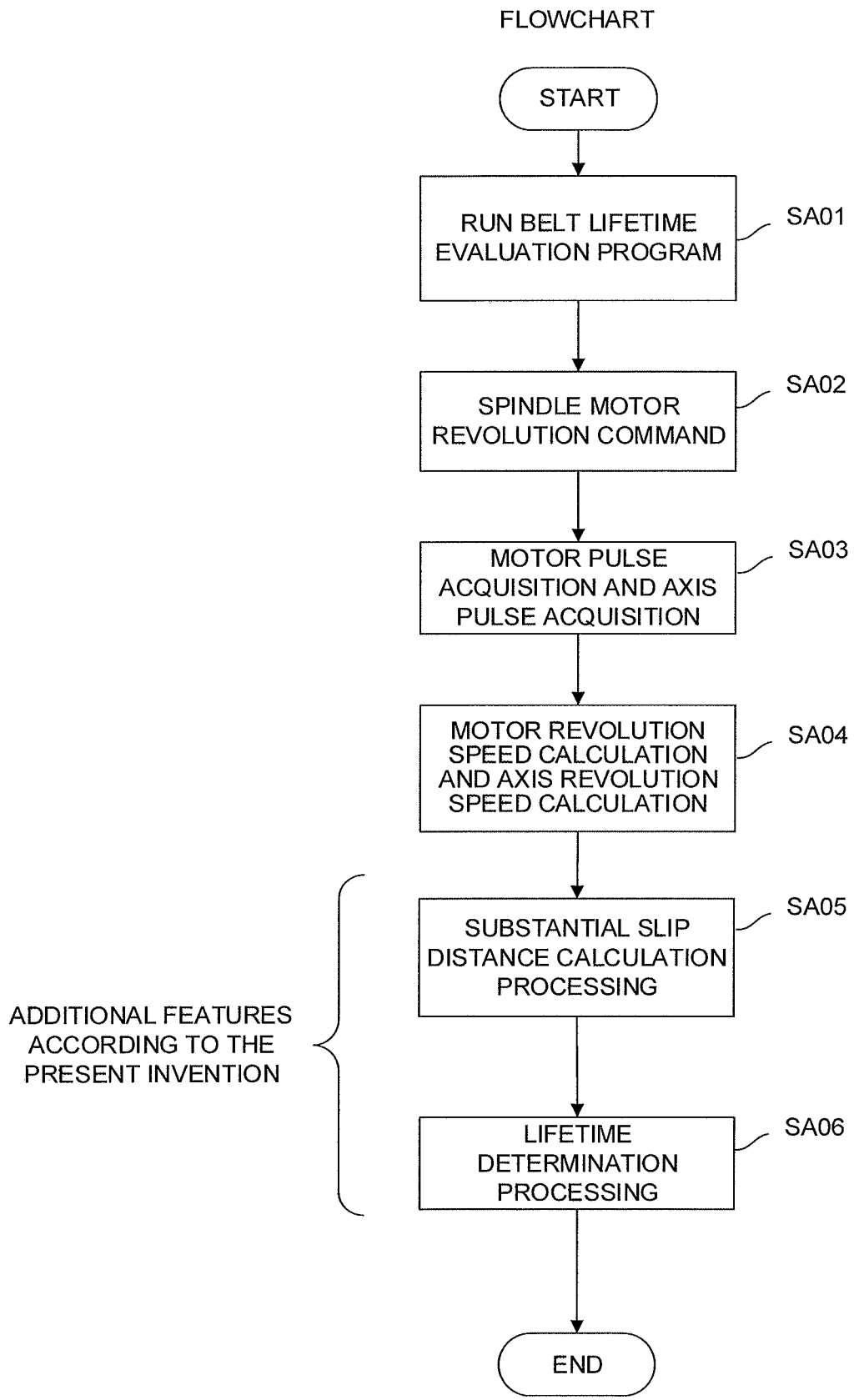

NUMERICAL CONTROLLER DETECTING A LIFETIME OF A BELT

BACKGROUND OF THE INVENTION

1. Field of the Invention

The present invention relates to a numerical controller, and more particularly to a numerical controller capable of detecting a lifetime of a belt provided between a spindle and a motor.

2. Description of the Related Art

A power transmission unit in a machine tool such as a belt that transmits a rotative power of a motor to a spindle reaches the end of its lifetime as a result of long-term use. Slip occurs in a V-belt or a flat belt between a belt and a pulley depending on the use conditions, the number of revolutions of the motor, and acceleration/deceleration. As part of friction work due to the slip affects wear of the belt, slip is considered as a factor affecting the lifetime of the belt. Also, as the degradation of the belt progresses, slip tends to occur and the amount of slip tends to increase.

It has been traditionally performed to detect an abnormality such as slip of a belt that couples a motor to a spindle in a machine tool.

For example, Japanese Patent Application Laid-Open No. 61-103750 discloses an abnormality detection method according to which a revolution speed of a spindle is compared with a revolution speed of a motor, and it is determined that an abnormality has occurred in a power transmission unit between the spindle and the motor when the difference between the revolution speed of the spindle and the revolution speed of the motor deviates from a speed difference that takes into account a predefined reduction ratio between the spindle and the motor.

Also, Japanese Patent Application Laid-Open No. 2005-246534 discloses a method according to which a command revolution speed of a controller is compared with an actual revolution speed of a spindle, it is determined that an abnormality has occurred when a state where a ratio of these two speeds exceeds an allowable value continues for an allowable time, and a spindle motor is stopped.

Japanese Patent Application Laid-Open No. 2015-106936 discloses an abnormality detection method according to which one-revolution signal detection means is provided for outputting a signal each time the spindle makes one revolution, a rotation angle of a motor during a period from the detection of the one-revolution signal to the detection of a next one-revolution signal is calculated, and it is determined that an abnormality has occurred in a power transmission portion between the spindle and the motor when an amount of change of the motor revolution angle between two one-revolution signals fails to satisfy a predetermined condition or when the difference between the revolution speed of the motor and the revolution speed of the spindle deviates from a predetermined condition.

Further, Japanese Patent Application Laid-Open No. 5-233046 discloses a slip detection device that stores a last spindle stop position and a present spindle stop position every time the spindle is stopped, obtains the deviation between these two positions, and determines that a slip has occurred when the deviation therebetween exceeds an allowable upper limit value.

Although the above-described prior-art techniques can detect the fact that an abnormality has occurred and continues to exist in the belt, it is difficult to detect the lifetime of the belt before the end of the lifetime is reached. As the degradation of the belt progresses, slip becomes more likely to occur and the amount of the slip tends to increase rapidly. Accordingly, the prior-art techniques often have a threshold value defined for determining that an abnormality has occurred in a state where a large slip begins to be observed or in a state where breakage of the belt has occurred or should occur. Meanwhile, in a state where a slight slip less than the threshold value occurs, it is not possible to detect the lifetime of the belt before breakage or the like of the belt actually occurs.

SUMMARY OF THE INVENTION

In view of the above, an object of the present invention is to provide a numerical controller that achieves detection of a lifetime of a belt in a machine whose axis and motor are coupled by the belt.

The present invention provides a numerical controller that obtains a substantial slip distance of a belt by integrating the slips occurring in the belt and determines that an end of a lifetime of the belt has reached when the obtained substantial slip distance exceeds a predetermined threshold. The numerical controller according to the present invention measures the substantial slip distance of the belt in a state where the tension of the belt is adjusted as appropriate. At this point, a belt lifetime evaluation test program prepared in advance is used in order to carry out every measurement under the same or similar conditions. The substantial slip distance of the belt in the state where the test program is running is obtained, and it is determined that the end of the lifetime of the belt has been reached when the obtained substantial slip distance exceeds the threshold and then an abnormality of the belt is notified to an operator.

In addition, the numerical controller according to the present invention is adapted to control a machine that performs belt-driving operation to transmit a driving force of a motor to a axis via the belt that couples the motor to the axis, and the numerical controller includes a axis pulse acquisition unit that obtains a pulse of the axis, a motor pulse acquisition unit that obtains a pulse of the motor, a spindle revolution speed calculation unit that calculates a revolution speed of the axis based on the obtained pulse of the axis, a motor revolution speed calculation unit that calculates a revolution speed of the motor based on the obtained pulse of the motor, a substantial slip distance calculation unit that calculates a substantial slip distance of the belt on the basis of the revolution speed of the axis and the revolution speed of the motor, and a belt lifetime determination unit that determines that an end of a lifetime of the belt has been reached when the substantial slip distance of the belt exceeds the predetermined threshold.

The threshold used in determination of the lifetime of the belt by the belt lifetime determination unit in the numerical controller according to the present invention is specified on the basis of data collected at the time of execution of the belt lifetime evaluation test program.

According to the present invention, the operator can get the knowledge of the lifetime of the belt coupling the axis to the motor in advance, and it is made possible to prevent occurrence of failure of the machine. In addition, since the knowledge about the lifetime of the belt can be given in advance, it is made possible to encourage replacement operation to replace the belt, and prevent unintentional stoppage of the machining process due to belt breakage.

BRIEF DESCRIPTION OF THE DRAWINGS

The foregoing and other objects and features of the present invention will become apparent from the following description of embodiments with reference to the accompanying drawings, in which:

FIG. 5 is a diagram illustrating the operation of the numerical controller 100 illustrated in FIG. 4.

DETAILED DESCRIPTION OF THE PREFERRED EMBODIMENTS

Embodiments of the present invention will be described hereinbelow with reference to the drawings.

Figures 1, 2:
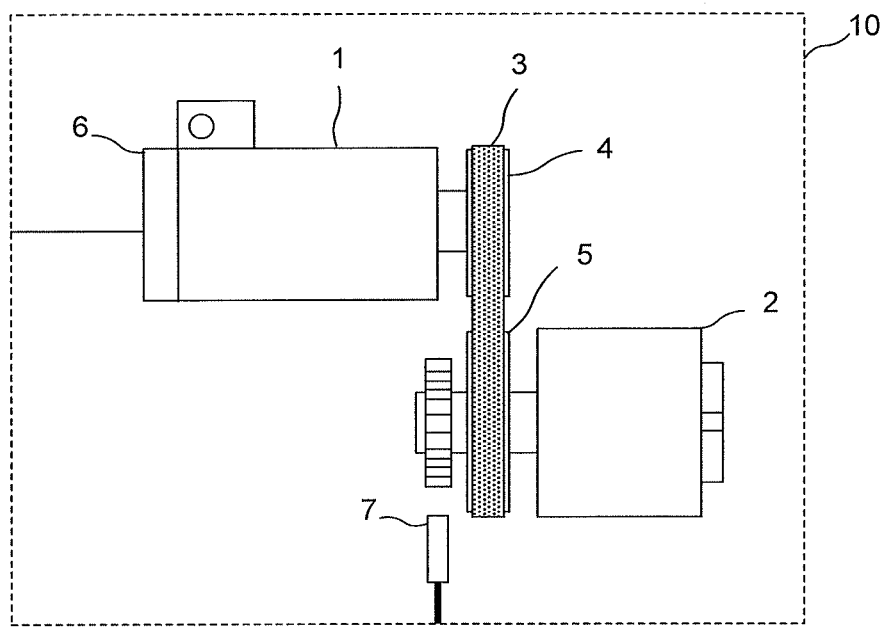
FIG. 1 shows a schematic configuration diagram of a cell control system according to an embodiment of the present invention.
FIG. 2 is a diagram illustrating an example of a test program for evaluating belt lifetime according to an embodiment of the present invention.

First, the procedure for calculating a slip distance of a belt in accordance with the present invention will be described. FIG. 1 is a diagram that illustrates a schematic configuration of a spindle drive unit in which a spindle motor drives a spindle by means of a belt.

The spindle drive unit 10 includes a spindle motor 1 and a spindle 2 mounted in a machine tool. A pulley 4 is attached to an output axis of the spindle motor 1 and another pulley 5 is attached to the spindle 2.

As illustrated in FIG. 1, the pulley 4 and the pulley 5 are interconnected by a belt 3, and the spindle motor 1 and the spindle 2 are interconnected by this connection structure. When the spindle motor 1 is driven, revolution of the output shaft is transmitted to the spindle 2 via the pulley 4, the belt 3, and the pulley 5.

The spindle motor is provided with a motor sensor 6 adapted to detect the number of revolutions of the spindle motor 1, and the spindle 2 is provided with an axis sensor 7 adapted to detect the number of revolutions of the spindle 2 such that the states of revolution of the spindle motor 1 and the spindle 2 can be detected by measuring feedback pulses each output from these sensors.

The spindle drive unit 10 illustrated in FIG. 1 may be configured such that a radius of the pulley 4 and a radius of the pulley 5 are different from each other so that the number of revolutions of the spindle 2 is different from the number of revolutions of the spindle motor 1. Meanwhile, for the sake of simplicity, it is assumed in the following description that the radius of the pulley 4 is identical with the radius of the pulley 5.

According to the present invention, when the machine tool is used which includes the spindle drive unit 10 whose spindle motor 1 is connected to the spindle 2 by the belt 3 as illustrated in FIG. 1, the number of feedback pulses $P_1$ (pulse) of the spindle motor 1 is detected by the motor sensor 6.

Also, the number of feedback pulses $P_2$ (pulse) of the spindle 2 is measured by the axis sensor 7. If the measurement time is t (msec), the number of pulses per revolution of the spindle motor 1 is $P_1'$ (pulse/rev), and the number of pulses per revolution of the spindle 2 is $P_2'$ (pulse/rev), then the number of revolutions of the spindle motor 1 $S_1(t)$ (rpm) and the number of revolutions of the spindle 2 $S_2(t)$ (rpm) are given by the following expression 1.

$$S_1(t) = 60000 \times (P_1/P_1') \times \frac{1}{t}$$

$$S_2(t) = 60000 \times (P_2/P_2') \times \frac{1}{t}$$

[Expression 1]

Here, if the pulley radii of the spindle motor 1 and the spindle 2 are $r_1$ (mm) and $r_2$ (mm), respectively, then a substantial slip distance L (mm), which is an integrated value of slips occurring from the start of driving of the spindle motor 1 to the time T (min) is given by the following expression (2).

$$L = 2\pi \int_0^T |r_1 S_1(t) - r_2 S_2(t)| dt$$

[Expression 2]

In addition, let us assume here that an allowable maximum slip distance is indicated by $L_{max}$ (mm). An abnormality of the belt is notified to an operator when the slip distance L becomes larger than an allowable maximum slip distance $L_{max}$ (i.e., $L > L_{max}$).

The values of $L_{max}$ may be defined by specifying the allowable maximum slip distance $L_{max}$ through a lifetime test or the like that uses a test program prepared in advance. When actually determining the lifetime of the belt, the lifetime determination is carried out by executing a program for evaluating the lifetime of the belt which instructs the spindle motor 1 to follow the same command as that of the test program used in the lifetime test, and comparing the slip distance L obtained as a result of the execution of the program with the allowable maximum slip distance $L_{max}$. It should be noted that sampling of feedback pulses is performed in a fine cycle such as interpolation period (ITP) (distributed cycle).

In the following, the procedure described above will be explained by way of a specific example.

It is assumed in this embodiment that the lifetime of the belt 3 is determined by controlling the machine tool by the numerical controller and executing the belt lifetime evaluation program (test program) on the numerical controller. FIG. 2 is a diagram that illustrates an example of the belt lifetime evaluation program (test program).

Figure 3:
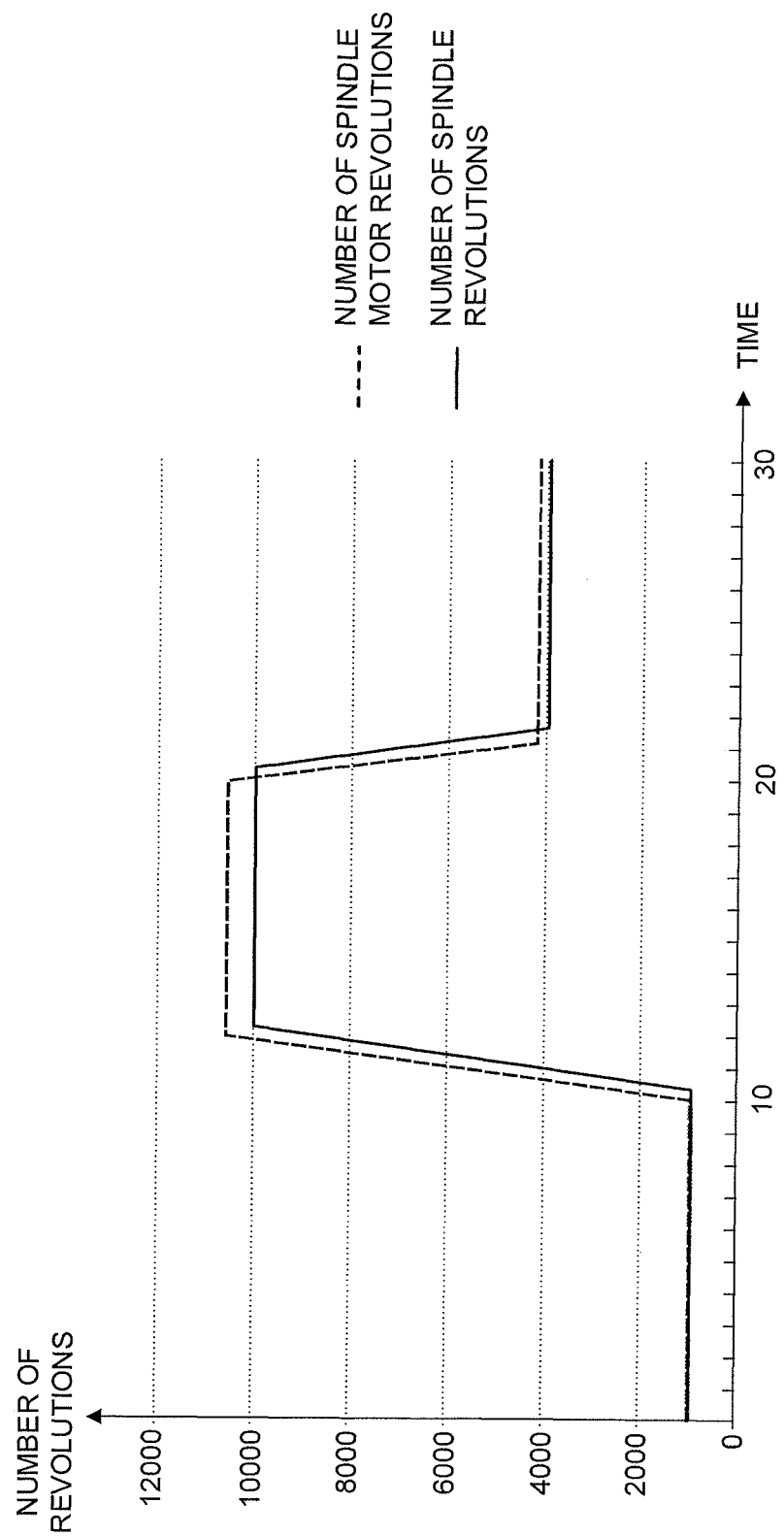
FIG. 3 is a graph illustrating the number of revolutions of the spindle motor and the spindle detected at the time of execution of the test program according to an embodiment of the present invention.

Let us assume that the number of revolutions of the spindle motor 1 and the number of revolutions of the spindle 2 as illustrated in FIG. 3 are obtained as a result of execution of the belt lifetime evaluation program (test program) whose example is illustrated in FIG. 2. Here, assuming that the radius of the pulley is $r_1 = r_2 = 50$ (mm) and the measurement time is T=0.5 (min), the substantial slip distance L can be obtained by the following expression 3. Whether or not the belt 3 has reached the end of its lifetime can be determined by comparing the slip distance L thus obtained with the allowable maximum slip distance $L_{max}$ specified in advance for the numerical controller through the lifetime test or the like.

$$L = 2\pi \int_0^T |r_1 S_1(t) - r_2 S_2(t)| dt$$

[Expression 3]

-continued $$= 100\pi \int_0^{0.5} |r_1 S_1(t) - r_2 S_2(t)| dt \text{ (mm)}$$

In this embodiment, it should be noted that not only the section where the relationship of (number of spindle motor revolutions)≥(number of spindle revolutions) exists but also the section where the relationship of (number of spindle motor revolutions)<(number of spindle revolutions) (the region extending from the time point of 21 seconds onward in the graph illustrated in FIG. 3) exists. In such a case, the conventional technology disclosed in Japanese Patent Application Laid-Open No. 05-233046 only take into account the difference in position at each stoppage of the spindle. As a result, when the direction of slip changes as in the present embodiment, the Japanese Patent Application Laid-Open No. 05-233046 cannot obtain the actual slip distance. In contrast, the method of the present invention in use adds absolute values to the differences and carries out the integration operation, so that the slip distance can be calculated as a positive value at every region, which makes it possible to obtain the actual slip distance at every region.

Figure 4:
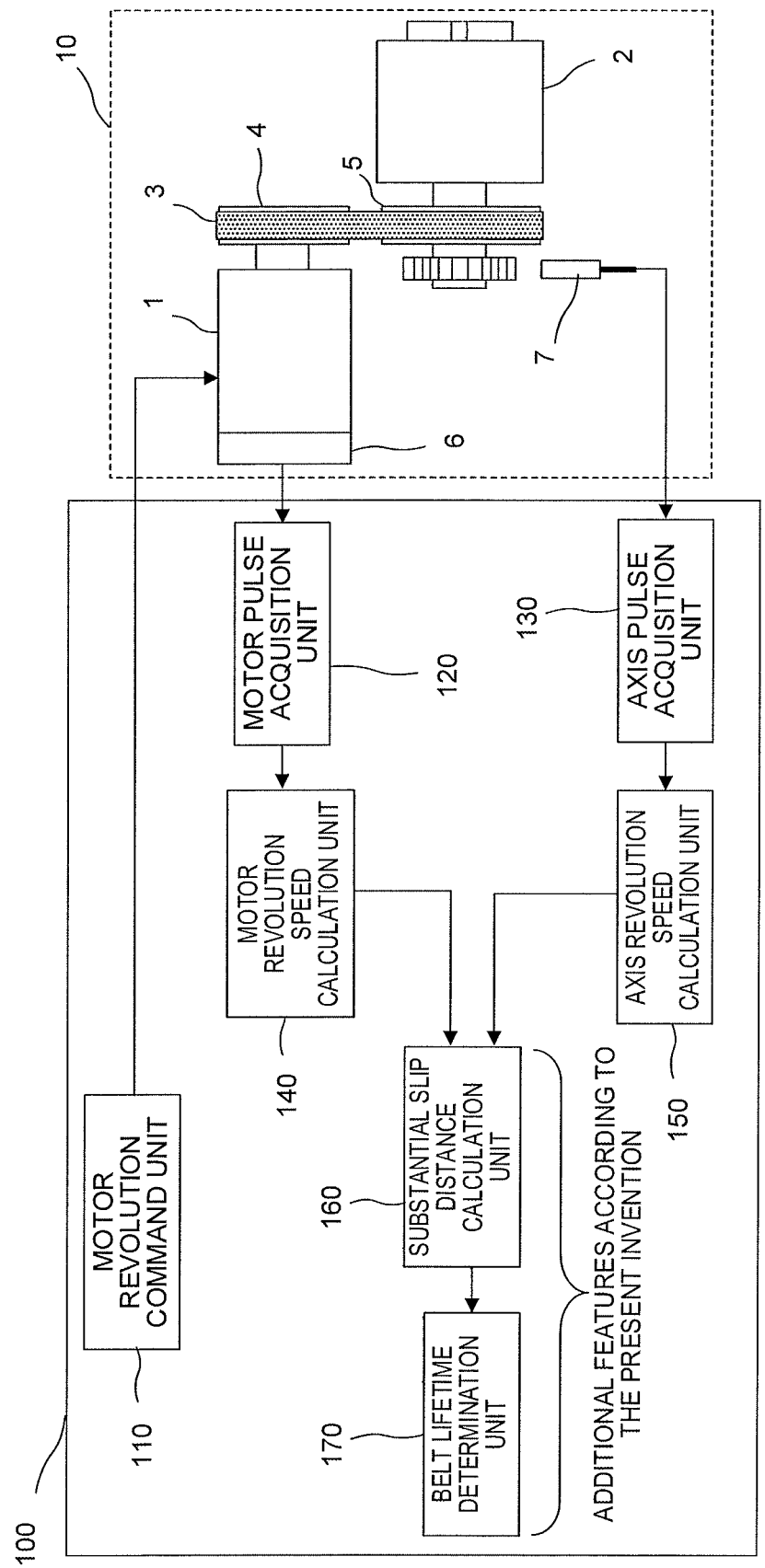
FIG. 4 is a schematic functional block diagram of a numerical controller according to an embodiment of the present invention.

FIG. 4 is a functional block diagram that illustrates principal features of the numerical controller according to this embodiment.

FIG. 5 is a flowchart that illustrates the flow of processing according to this embodiment. The operation of the numerical controller of this embodiment will be described hereinbelow with reference to FIGS. 4 and 5. The substantial slip distance calculation unit 160, the belt lifetime determination unit 170 in FIG. 4, and the steps SA04 and SA05 in FIG. 5 are the functions and procedures introduced by the present invention.

[Step SA01] The numerical controller 100 reads the belt lifetime evaluation program from a memory unit (not shown) and runs the program.

[Step SA02] The motor revolution command unit 110 outputs a revolution command to the spindle motor 1 in accordance with commands of the individual blocks of the belt lifetime evaluation program executed by the numerical controller 100.

[Step SA03] The motor pulse acquisition unit 120 obtains a motor pulse from the motor sensor 6. In addition, the axis pulse acquisition unit 130 obtains an axial pulse from the axis sensor 7.

[Step SA04] The motor revolution speed calculation unit 140 calculates the revolution speed of the spindle motor 1 based on the motor pulse obtained by the motor pulse acquisition unit 120. In addition, the axis revolution speed calculation unit 150 calculates the revolution speed of the spindle 2 on the basis of the axis pulse obtained by the axis pulse acquisition unit 130.

[Step SA05] The substantial slip distance calculation unit 160 calculates the substantial slip distance L on the basis of the revolution speed of the spindle motor 1 and the revolution speed of the spindle 2 calculated in the step SA 04.

[Step SA06] The belt lifetime determination unit 170 carries out the lifetime determining process on the basis of the substantial slip distance L obtained in the step SA05 and the allowable maximum slip distance $L_{max}$ set in advance in the memory unit (not shown).

Although the embodiments of the present invention have been described in the foregoing, the present invention is not limited to the examples of the above-described embodiments, and can be implemented in various modes with modifications and changes made as appropriate.

For example, the above-described embodiments are described based on the example of the spindle drive unit in which the spindle motor drives the spindle by means of the belt. However, the present invention is not limited to the spindle motor and the spindle, and the present invention can be applied as appropriate to determination of the lifetime of the belt in a drive system where a motor drives a shaft by means of a belt.

Whilst the embodiments of the present invention have been described above, the present invention is not limited to the examples of the embodiments described herein, and can be implemented in other modes with modifications and changes made thereto as appropriate.

The invention claimed is:

1. A numerical controller controlling a machine adapted to perform belt-driving operation to transmit a driving force of a motor shaft to an axis via a belt, the motor shaft being coupled to the axis by the belt, the numerical controller comprising:
    an axis sensor configured to obtain a pulse of the axis;
    a motor sensor configured to obtain a pulse of the motor; and
    a processor configured to:
        calculate a revolution speed of the axis based on the obtained pulse of the axis;
        calculate a revolution speed of the motor based on the obtained pulse of the motor;
        calculate a substantial slip distance of the belt on the basis of an integration of an absolute value of a difference between the revolution speed of the axis, the revolution speed of the motor, a first radius from the axis to the belt, and a second radius from the motor shaft to the belt; and
        compare the substantial slip distance to a predetermined slip distance threshold; and
        make a determination that an end of a lifetime of the belt has been reached in response to the comparison exceeding the predetermined slip distance threshold.

2. The numerical controller according to claim 1, wherein the threshold used by the processor to make the determination of the lifetime of the belt is specified on the basis of data collected at the time of execution of a test program for evaluation of the lifetime of the belt.

* * * * *